United States Patent
van Thiel

(10) Patent No.: US 11,260,843 B2
(45) Date of Patent: Mar. 1, 2022

(54) PARKING BRAKE VALVE DEVICE

(71) Applicant: WABCO GmbH, Hannover (DE)

(72) Inventor: Julian van Thiel, Grossburgwedel (DE)

(73) Assignee: ZF CV SYSTEMS EUROPE BV, Brussels (BE)

(*) Notice: Subject to any disclaimer, the term of this patent is extended or adjusted under 35 U.S.C. 154(b) by 94 days.

(21) Appl. No.: 16/642,383

(22) PCT Filed: May 29, 2018

(86) PCT No.: PCT/EP2018/064072
§ 371 (c)(1),
(2) Date: Feb. 27, 2020

(87) PCT Pub. No.: WO2019/042602
PCT Pub. Date: Mar. 7, 2019

(65) Prior Publication Data
US 2020/0189550 A1   Jun. 18, 2020

(30) Foreign Application Priority Data
Aug. 31, 2017 (DE) .................... 10 2017 008 184.0

(51) Int. Cl.
*B60T 15/04* (2006.01)
*B60T 15/02* (2006.01)

(52) U.S. Cl.
CPC .......... *B60T 15/041* (2013.01); *B60T 15/027* (2013.01)

(58) Field of Classification Search
CPC .... B60T 15/041; B60T 15/027; B60T 13/263; B60T 7/20; B60T 17/221; B60T 13/683; B60T 13/385
See application file for complete search history.

(56) References Cited

U.S. PATENT DOCUMENTS 7,832,813 B2 * 11/2010 Bensch ................. B60T 13/683
                                                              303/15
10,946,848 B2 * 3/2021 Van Thiel ............. B60T 13/662
(Continued)

FOREIGN PATENT DOCUMENTS

DE   102014006013 A1   10/2015
DE   102016117784 A1    3/2018
(Continued)

*Primary Examiner* — Pamela Rodriguez
(74) *Attorney, Agent, or Firm* — Leydig, Voit & Mayer, Ltd.

(57) ABSTRACT

A parking brake valve device for controlling a storage spring parking brake in an electropneumatic brake system includes a compressed air input configured to be connected to a compressed air supply, a parking brake output configured to control a storage spring parking brake, and a trailer-control control output configured to control a trailer control valve (TCV) for a trailer brake system. The parking brake valve device further includes a relay valve pilot control region and a relay valve, a TCV pilot control region configured to control the trailer-control control output, an inlet valve configured to be controlled with a first electrical control signal for supplying air to the TCV pilot control region and the relay valve pilot control region, and a connecting valve configured to be controlled by a second control signal to connect and disconnect the TCV pilot control region and the relay valve pilot control region.

16 Claims, 2 Drawing Sheets

(56) References Cited

U.S. PATENT DOCUMENTS

| | | | | |
|---|---|---|---|---|
| 2010/0187902 A1* | 7/2010 | Bensch | ................ | B60T 13/683 |
| | | | | 303/127 |
| 2010/0237690 A1* | 9/2010 | Forster | ................ | B60T 13/263 |
| | | | | 303/13 |
| 2020/0189545 A1* | 6/2020 | Bensch | ................ | B60T 13/683 |

FOREIGN PATENT DOCUMENTS

| EP | 3112230 A1 | 1/2017 |
|---|---|---|
| WO | WO 2008101592 A2 | 8/2008 |
| WO | WO 2009046780 A2 | 4/2009 |
| WO | WO 2009098003 A2 | 8/2009 |
| WO | WO 2015154787 A1 | 10/2015 |

\* cited by examiner

PARKING BRAKE VALVE DEVICE

CROSS REFERENCE TO RELATED APPLICATIONS

This application is a U.S. National Phase Application under 35 U.S.C. § 371 of International Application No. PCT/EP2018/064072, filed on May 29, 2018, and claims benefit to German Patent Application No. DE 10 2017 008 184.0, filed on Aug. 31, 2017. The International Application was published in German on Mar. 7, 2019 as WO 2019/042602 under PCT Article 21(2).

FIELD

The invention relates to a parking brake valve device for controlling the storage spring parking brake and a trailer control valve for a connected trailer brake system.

BACKGROUND

Storage spring parking brakes of commercial vehicles are self-locking in a pressureless or vented state and are filled or supplied with air via a parking brake valve device in order to release them. Electrical pneumatic handbrakes (EPH) allow the release and locking of the storage spring parking brake or the parking brake by means of electrical actuation. For safety reasons, these are preferably bi-stable, so that without current both the parking condition with the storage spring parking brake (parking brake) applied as well as the driving condition with the storage spring parking brake released or filled will hold safely.

Trailer brake systems are controlled by the towing vehicle, for which purpose a trailer control valve (TCV) is provided, which generally controls the pneumatic coupling (for example the yellow and red coupling head) for the trailer brake system, i.e. the trailer control line and trailer supply line. In general, a compressed air inversion of an input pneumatic control signal takes place in the trailer control valve, so that the trailer control valve is controlled by a pneumatic control signal, which it outputs in inverted form to the trailer brake system; this, among other things, ensures that the service brakes of the trailer are braked when the towing vehicle is braked by its parking brake.

In the driving setting, the storage spring parking brakes of the towing vehicle and the service brake of the trailer vehicle are released. In the parking setting, the storage spring parking brake is engaged, i.e. vented, and the service brake of the trailer vehicle is supplied with air via the TCV.

Furthermore, a so-called trailer control setting is generally provided, in which the storage spring parking brake in the towing vehicle is engaged, but the service brake in the trailer is released; this allows it to be checked whether the towing vehicle alone can hold the trailer with the trailer brake system that has been released, so that even in the event of a leakage or a failure of the pneumatically applied brake in the trailer, for example, the reliable storage spring parking brake of the towing vehicle alone can also hold the trailer.

In general, leaks in the pneumatic control system and valves as well as electrical failure are generally problematic, which should not endanger the respective condition.

SUMMARY

In an embodiment, the present invention provides a parking brake valve device for controlling a storage spring parking brake in an electropneumatic brake system. The parking brake valve device includes a compressed air input configured to be connected to a compressed air supply, a parking brake output configured to control a storage spring parking brake, and a trailer-control control output configured to control a trailer control valve (TCV) for a trailer brake system, the trailer-control control output being configured to be supplied with air for releasing the trailer brake system. The parking brake valve device further includes a relay valve pilot control region and a relay valve configured to be controlled by the relay valve pilot control region, which connects the compressed air input to the parking brake output when in an operated position and which vents the parking brake output when in a non-operated position. The parking brake valve device additionally includes a TCV pilot control region configured to control the trailer-control control output, an inlet valve configured to be controlled with a first electrical control signal for supplying air to the TCV pilot control region and the relay valve pilot control region, and a connecting valve configured to be controlled by a second control signal to connect and disconnect the TCV pilot control region and the relay valve pilot control region. The following settings are configured to be set by setting only the inlet valve and the connecting valve: a driving setting with the parking brake output supplied with air and the trailer-control control output supplied with air, a parking setting with the parking brake output vented and the trailer-control control output vented, and a trailer control setting with the parking brake output vented and the trailer-control control output supplied with air.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
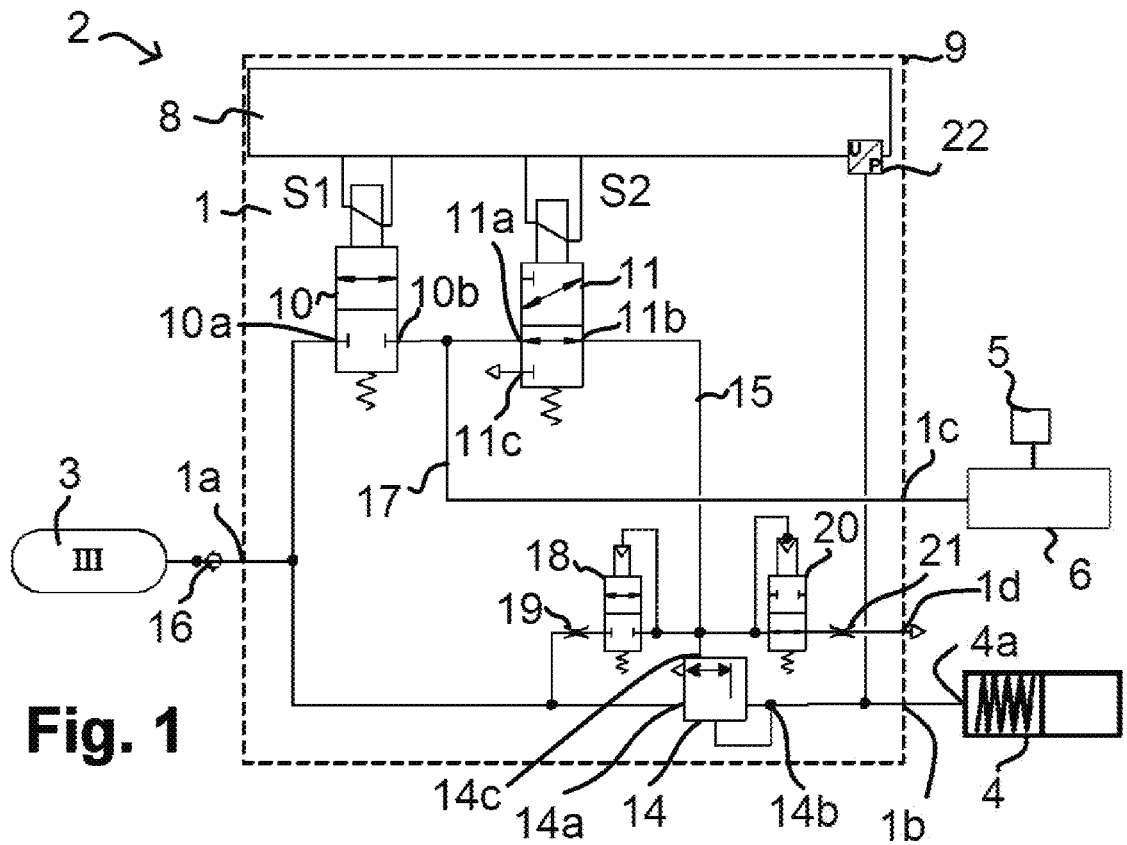
FIG. 1 shows an electropneumatic circuit diagram of a section of a brake system with a parking brake valve device according to a first embodiment of the invention.

The present application describes parking brake valve devices that enable a high safety level at low cost both for its own brake system and for a connected trailer. Furthermore, the present application describes electropneumatic brake systems with parking brake valve devices.

A parking brake valve device is connected with its compressed air input to a compressed air supply, for example to a compressed air storage system, and with its parking brake output to a spring storage brake, for which it generally has a relay valve that connects the compressed air input and the parking brake output to each other. The relay valve is controlled by a relay valve pilot control region, which acts on the pneumatic control input of the relay valve. Furthermore, the parking brake valve device has a trailer-control control output, which controls a downstream trailer control valve (TCV) for the trailer brake system, and also a TCV pilot control region for controlling the trailer-control control output.

Here, two valves that can be controlled electrically are provided, with which the different settings can be set; an inlet valve can be electrically controlled and connects the TCV pilot control region to the compressed air input or blocks it from this respectively; furthermore, a connecting valve that can be controlled electrically is provided for optional connection of the TCV pilot control region and the relay valve pilot control region depending on a second electrical control signal.

The present application describes that the TCV pilot control region can be controlled by a common inlet valve and the relay valve pilot control region is also controlled by a connecting valve. Thus, both pilot control regions can be to supplied with compressed air via the two electrically controlled valves in order to pneumatically control the relay valve on the one hand, so that it supplies air to the storage spring parking brake via the parking brake output and thus releases it, and furthermore supplies air to the trailer-control control output via the TCV pilot control region. Thus, a driving setting with released brakes and a parking setting with applied brakes in the towing vehicle and trailer are already possible. Furthermore, the trailer control setting can be set by the same electrical valves by further supplying air to the TCV pilot control region and thus supplying air to the TCV control output, however the relay valve pilot control region is vented via the appropriately controlled connecting valve and thus applies the storage spring parking brake.

Here, different circuitry designs of these valves are possible: According to a preferred design, the connecting valve is embodied as an electrically controlled 3/2-valve, which preferably connects the two pilot control regions to each other when in the electrically unoperated basic state. Thus, the first electrical control signal can be used to determine whether both brake systems are locked or released, i.e. in the parking setting or the driving setting.

The second electrical control signal allows disconnection of the relay valve pilot control region when the inlet valve is open, in particular also venting of the relay valve pilot control region to apply the storage spring parking brake, although the trailer-control control output is further supplied with air via the TCV pilot control region. Thus, the trailer control setting is set.

The relay valve is advantageously controlled by a self-holding bypass circuit, which is connected to the relay valve pilot control region and thus to the pneumatic control input of the relay valve. With a single sufficient pressure application, the bypass circuit can automatically apply this to the compressed air input or to the input of the relay valve of the relay valve pilot control region, so that the open position of the relay valve is safely maintained. Furthermore, by active venting of the relay valve pilot control region, the relay valve pilot control region can be advantageously connected directly to a vent, so that the locking state of the relay valve, i.e. the parking setting, is also safely maintained. This allows leaks that lead to small air flows to be safely compensated; smaller leaks in pipes or also even of the valves thus do not lead to switching of the relay valve according to the invention, so that the relay valve pilot control region is safely held in its once actively set setting. The bypass circuit can be formed in particular by pneumatically controlled 2/2-check valves with one choke each, which are respectively connected between the relay valve input and the compressed air input and between the relay valve pilot control region and the parking brake output.

In particular, this also achieves the advantage that the self-sustaining holding or self-holding of the pressure state of the relay valve pilot control region is also maintained in the TCV pilot control region via the generally open connecting valve, so that the high safety level is specified not only for the control of the relay valve and thus the storage spring parking brake, but also for the TCV.

In this case, the TCV pilot control region may either be connected directly to the TCV control unit according to different embodiments, or the TCV pilot control region is connected to both the TCV pilot control region and the parking brake output via a supplementary pneumatic circuit, for example a select-high valve or a pneumatically controlled valve, in order to ensure a reliable air supply to the TCV control output when the parking brake output is supplied with air; thus, the greater volumetric throughput of the relay valve can also be used for the TCV control output, which thus also compensates for minor leaks, for example in the connecting line to the trailer.

Figure 2:
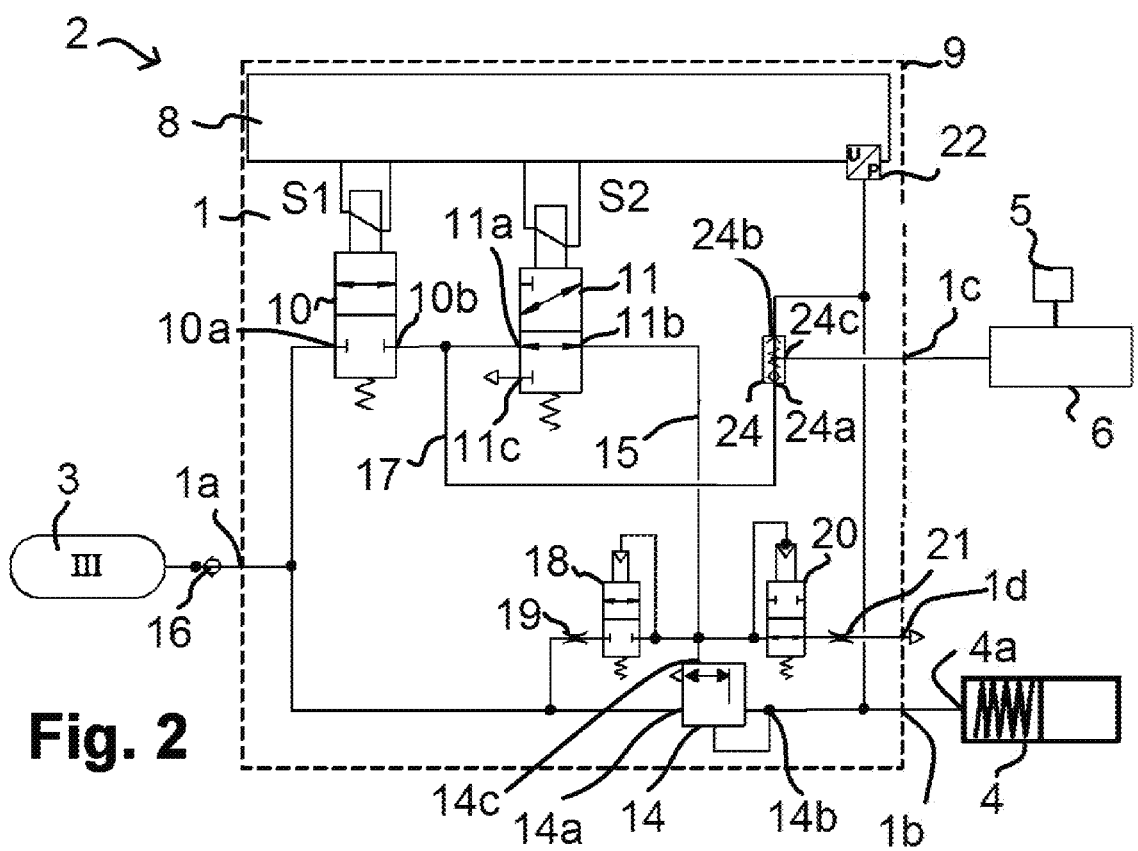
FIG. 2 shows an electropneumatic switching diagram of a section of a brake system with a parking brake valve device in accordance with a second embodiment of the invention with a select-high valve.
Figure 3:
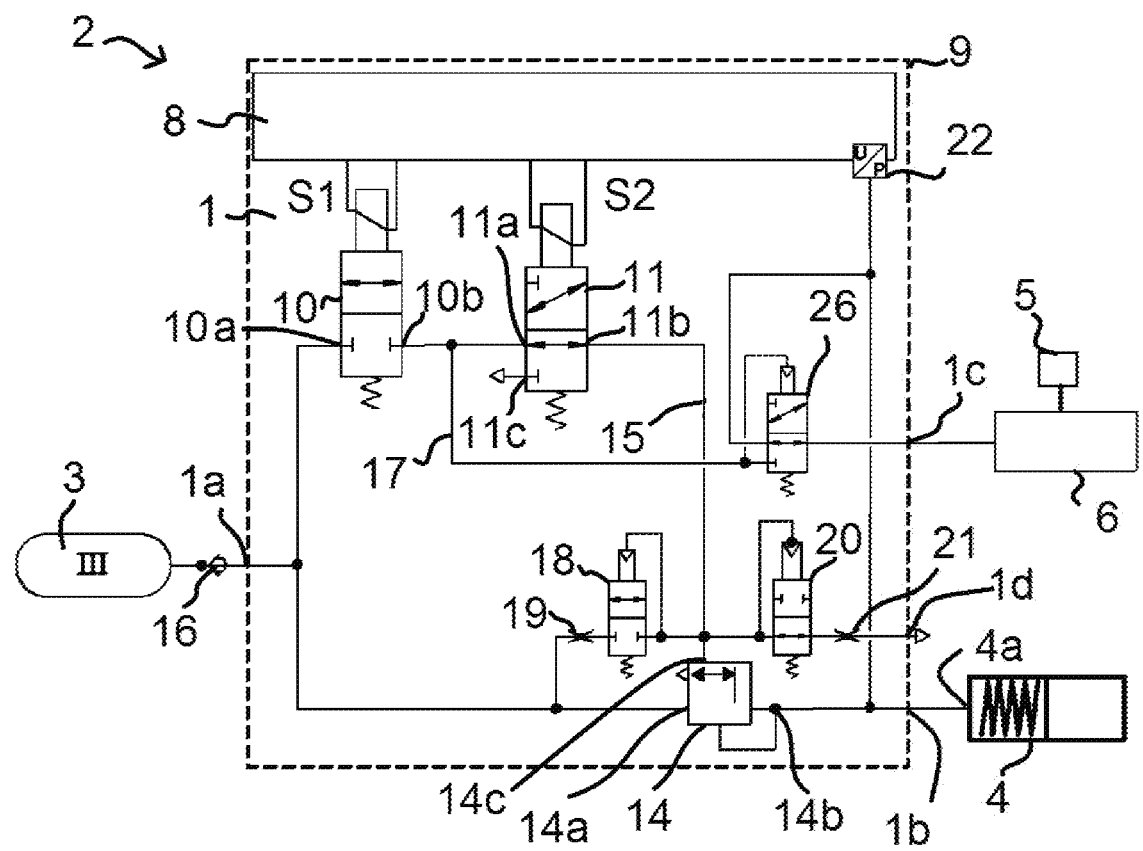
FIG. 3 shows a corresponding electropneumatic switching diagram according to a third embodiment of the invention with an additional pneumatic TCV control valve.

FIGS. 1 to 3 each show an electropneumatic circuit diagram of a relevant section of an electropneumatic brake system 2 of a commercial vehicle, which has an electro-pneumatic parking brake valve device 1, a compressed air storage device 3 for the compressed air supply, a storage spring parking brake (parking brake) 4 controlled by the parking brake valve device 1 and a trailer control valve (TCV) 6 for a downstream trailer brake system 5 of a trailer. The storage spring parking brake 4 is usually applied in a pressureless, non-filled state and is released by supplying air or by compressed air filling via its input 4a. The parking brake valve device 1 is controlled by an electronic control device (ECU) 8 and forms a parking brake module 9 with the ECU 8. The ECU 8 can in turn be operated in the usual way, for example by the driver via a parking brake switch and an activation signal; furthermore, the ECU 8 can also be controlled in the context of a driver assistance function or as part of a driving stability program in order to apply the storage spring parking brake 4 if necessary, for example in the event of a failure of a service brake.

The parking brake valve device 1 can, for example, be formed in one piece or in a housing and connected to the ECU 8, so that the parking brake module 9 forms a unit.

The parking brake valve device 1 has a compressed air input 1a, which is connected to the compressed air storage device 3 via a non-return valve 16 and is thus supplied with a system pressure p0, for example. An inlet valve 10, which is formed as a self-locking 2/2-solenoid check valve, is connected to the compressed air input 1a. Furthermore, a parking brake output 1b, to which the storage spring parking brake 4 is connected, is connected via a relay valve 14 to the compressed air input 1a. The relay valve 14 is controlled by a relay valve pilot control region 15, which is in turn controlled via the inlet valve 10 and an outlet valve 11 connected to the inlet valve 10. The outlet valve 11 is formed as a 3/2-solenoid valve and when in its basic position connects the relay valve pilot control region 15 to the output 10b of the inlet valve 10.

A TCV pilot control region 17 is formed between the output 10b of the inlet valve 10 and the input 11a of the outlet valve 11 and is connected to a TCV control output 1c of the parking brake valve device 1. By controlling the inlet valve 10 by means of a first electrical control signal S1, the TCV pilot control region 17 can thus be connected to the compressed air input 1a and thus the compressed air storage system 3 and can be pressurized. In the basic position of the outlet valve 11, the relay valve pilot control region 15 and the TCV pilot control region 17 are connected to each other; if the ECU 8 actuates the outlet valve 11 by means of a second electrical signal S2, this connection is closed, wherein the TCV pilot control region 17 is locked at the outlet valve 11 and the relay valve pilot control region 15 is vented via the actuated outlet valve 11, i.e. is connected to a vent connection 11c. The vent connection 11c, as well as the further vent connections, in particular the vent of the relay valve 14 as well as a vent connection 1d of the parking brake valve device for venting the relay valve pilot control region 15 can be embodied together here.

The relay valve pilot control region 15 is formed by a bypass circuit 18, 19, 20, 21 to be self-holding or to store its state: the pneumatic control input 14c of the relay valve 14 is connected to the relay valve pilot control region 15, which furthermore is connected via an input-bypass valve 18 and a choke 19 to the compressed air input 1a, wherein furthermore the relay valve pilot control region 15 is connected in an appropriate manner via an outlet-bypass valve 20 and a choke 21 to the vent connection 1d. The bypass input valve 18 is self-locking and is opened by the relay valve pilot control region 15 when pressure is applied, so that the relay valve pilot control region 15 is then connected via the open bypass input valve 18 and the choke 19 to the compressed air input 1a. Accordingly, the bypass-output valve 20 is open when in the base state and is switched into its blocking position by the relay valve pilot control region 15, so that when in its pressureless state the relay valve pilot control region 15 is connected to the vent connection 1d via the open bypass output valve 20 and the choke 21 and thus remains vented, and in the case of an—even brief—application of compressed air via the open outlet valve 11 and the open inlet valve 10 the two bypass valves 18, 20 are switched such that the relay valve pilot control region 15 itself is connected via the opened bypass input valve 18 to the compressed air input 1a and thus to the system pressure p0, and furthermore locks the bypass output valve 20 and thus the venting thereof. The bypass-circuit 18, 19, 20, 21 is thus used to store a pressure state of the relay valve pilot control region 15 that is input once via the inlet valve 10 and the outlet valve 11. The chokes 19 and 21, which, as shown in FIG. 1 may be implemented in series before and after the bypass-valves 18, 19, but also for example integrated within the bypass valves 18, 19, set a time constant that enables reversal of the pressure state of the relay valve pilot control region 15: by controlling the inlet valve 10 and outlet valve 11, the relay valve pilot control region 15 can be supplied with pressure without the currently open output-bypass valve 20 immediately venting this pressure supply, as the choke (output choke) 21 prevents an excessively rapid loss of pressure; thus, the pressure surge input to the relay valve pilot control region 15 will switch the bypass output valve 20 with sufficient reliability and will thus lock the vent connection 1d before it has lost too much pressure via the choke 21. The same applies to the input area: the pressurized relay valve pilot control region 15 holds the bypass input valve 18 open via the choke 19; but if the outlet valve 11 is controlled by the second electrical control signal S2 and thus the relay valve pilot control region 15 is vented via the outlet valve 11, the bypass input valve 18 switches back sufficiently quickly, without sufficient compressed air flowing back via the choke 19 to maintain the pressure in the relay valve pilot control region 15.

In principle, both check valves 18, 19 should switch simultaneously; however, a pressure value range can also be allowed in the relay valve pilot control region 15, in which both check valves 18, 19 are open; this can be allowed as a short-term state during switchover.

Thus, by means of the electrical control signals S1 and S2, on the one hand the relay valve pilot control region 15 and on the other hand the TCV pilot control region 17 can be set: in the green setting shown in FIG. 1 with S1=0, S2=0, the pilot control regions 15, 17 are connected to each other via the open outlet valve 11 and are connected via the bypass output valve 20 to the vent connection 1d, so that both pilot control regions 15 and 17 are vented. The relay valve 14 locks and thus vents the parking brake output 1b, so that the storage spring parking brake (parking brake) 4 is applied, and the TCV 6 continues to receive an unpressurized input, which it inverts and thus applies the service brake in the trailer brake system 5. Thus, the commercial vehicle 2 and the trailer with its trailer brake system 5 are in their braked parking setting.

With S1=1, S2=0, the TCV pilot control region 17 is first set under pressure via the open inlet valve 10 and the relay valve pilot control region 15 is also set under pressure via the still open outlet valve 11, so that the relay valve 14 opens and supplies air to the storage spring parking brake so that the parking brake is released; furthermore the TCV 6 is supplied with pressure by the system pressure in the TCV pilot control region 17, the TCV 6 in turn inverts the pressure and thus releases the service brake in the trailer brake system 5. Thus, the commercial vehicle 1 or the vehicle combination is in its driving setting, i.e. with released brakes.

Furthermore, a trailer control setting is provided, in which S1=1, S2=1.

With S1=1, the TCV pilot control region 17 is again subjected to pressure, and this pressure signal is inverted in TCV 6, so that the trailer service brake in the trailer brake system 5 is released. However, since S2=1 also, the outlet valve 11 is also actuated and vents the relay valve pilot control region 15, so that the relay valve 14 locks and the storage spring parking brake 4 vents, i.e. the parking brake is applied.

In this trailer control setting it can thus be checked whether the braking commercial vehicle 2 can hold the unbraked trailer or the trailer with the released trailer brake system 5.

A pressure sensor 22 is provided to measure the pressure in the parking brake output 1b, i.e. the condition of the storage spring parking brake 4.

The embodiment of FIG. 2 differs from the first embodiment of FIG. 1 in that the TCV pilot control region 17 is connected to a first input 24a of a select-high valve 24, whose second input 24b is connected to the parking brake output 1b. The output 24c, which thus always experiences the higher of the two inputs 24a, 24b, is connected to the TCV control output 1c and thus the TCV 6.

In the embodiment of FIG. 2 with the additional select-high valve 24 with the preferred switch setting, in particular good venting of the TCV 6 and its supply is enabled via the output 24c and the input 24b as well as the relay valve 14, so that no venting is required via the pilot control region 17. Furthermore, it is ensured that the TCV control output 1c does not have a lower pressure applied than at the parking brake output 1b, which means in particular that the open relay valve 14 is not only connected to the parking brake output 1b, but also to the TCV control output 1c via the select-high-valve 24, and thus a faster and more reliable switching process is made possible by the larger volumetric throughput of the relay valve 14. Basically, FIG. 1 also offers the application of compressed air to the TCV control output 1c by opening the inlet valve 10, but the relay valve 14 in FIG. 2 basically allows a greater volumetric throughput.

In the embodiment of FIG. 2—as also in the embodiment of the FIG. 1—it is enabled that the TCV 6 is supplied with pressure without permanently loading the inlet valve 10: as described above with reference to the embodiment of FIG. 1, a bypass circuit 18, 19, 20, 21 is connected to the relay valve 14, which thus holds its state after once subjecting the pneumatic control input 14c to pressure until the pressure in the relay valve pilot control region 15 is actively changed again. Thus, the storage spring parking brake 4 can be pressurized by the held-open relay valve 14 and can thus remain in the released driving setting without the inlet valve 10 having to be open further for this purpose, that is also with S1=0, after the inlet valve 10 has been switched once. According to FIG. 2, this pressure state can also be output to the TCV control output 1c via the select-high valve 24, even if S1=0 is set afterwards and the inlet valve 10 thus locks. Thus, according to FIG. 2 the TCV 6 is no longer controlled via the TCV pilot control region 17 in this situation, but via the relay valve 14. Furthermore, in FIG. 2, control of the TCV control output 1c via the relay valve 14 is enabled, a high air throughput is enabled and thus rapid switching and also compensation of smaller leaks are ensured, for example in the control line to the trailer brake system 5.

The embodiment of FIG. 3 shows functionality corresponding to FIG. 2 with a TCV control valve 26, which is designed here as a pneumatically controlled 3/2-way valve: the TCV control valve 26 is switched by a one-time control of the inlet valve 10, i.e. with S1=1, by compressed air application to the TCV pilot control region 17, since the pneumatic control input is connected to the TCV pilot control region 17 with its first input connection. Thus, the TCV pilot control valve 26 switches to its actuated setting, in which the TCV pilot control region 17 is connected to the TCV control output 1c and thus to the TCV 6. This ensures reliable control via the TCV pilot control region 17, which is under pressure. However, if S1=0 and thus the inlet valve 10 locks, the compressed air application to the TCV 6 depends on the state of the relay valve 14: if the relay valve 14 locks and thus the storage spring parking brake 4 is also vented and thus the parking brake is applied, there is also no pressure applied to the TCV control output 1c via the second input connection. However, if the relay valve 14 is automatically held in its actuated position by the selfholding bypass circuit 18, 19, 20, 21, the pressure prevailing at the parking brake output 1b also prevails via the TCV precontrol valve 26 at the TCV control output 1c and thus at the TCV 6. Thus, the circuit of FIG. 3 offers the same functionality as that of FIG. 2.

Also the embodiment of the FIG. 3 thus enables good venting of the TCV 6 and its supply line via the TCV control valve 26, which is only brought into its switched setting by suitably high switching pressure; this ensures that the main part of the air volume in the TCV 6 and its supply line is vented via the relay valve 14.

The venting of the TCV pilot control region 17 is thus preferably realized indirectly via the relay valve pilot control region 15 with the embodiment. For this purpose, depending on the application, the outlet valve 11 is pulsed multiple times, whereby the pressure can be further reduced depending on the design of the pressure switching thresholds of the bypass valves.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A parking brake valve device for controlling a storage spring parking brake in an electropneumatic brake system, wherein the parking brake valve device comprises:
   a compressed air input configured to be connected to a compressed air supply;
   a parking brake output configured to control the storage spring parking brake;
   a trailer-control control output configured to control a trailer control valve (TCV) for a trailer brake system, the trailer-control control output being configured to be supplied with air for releasing the trailer brake system;
   a relay valve pilot control region and a relay valve configured to be controlled by the relay valve pilot control region, which connects the compressed air input to the parking brake output when in an operated position and which vents the parking brake output when in a non-operated position;
   a TCV pilot control region configured to control the trailer-control control output;
   an inlet valve configured to be controlled with a first electrical control signal for supplying air to the TCV pilot control region and the relay valve pilot control region; and
   a connecting valve configured to be controlled by a second control signal to connect and disconnect the TCV pilot control region and the relay valve pilot control region;
   wherein the following settings are configured to be set by setting only the inlet valve and the connecting valve:
     a driving setting with the parking brake output supplied with air and the trailer-control control output supplied with air,
     a parking setting with the parking brake output vented and the trailer-control control output vented, and
     a trailer control setting with the parking brake output vented and the trailer-control control output supplied with air; and wherein the connecting valve is configured to connect, in the driving setting and the parking setting, the TCV pilot control region and the relay valve pilot control region.

2. The parking brake valve device as claimed in claim 1, wherein the inlet valve is an electrically controlled 2/2 check valve.

3. The parking brake valve device as claimed in claim 2, wherein the inlet valve is a self-locking 2/2 check valve.

4. The parking brake valve device as claimed in claim 1, wherein the TCV pilot control region is directly connected to the TCV control output.

5. The parking brake valve device as claimed in claim 1, wherein the TCV pilot control region is connected to the trailer control output via a select-high valve,
wherein the select-high valve is connected to the parking brake output for compressed air control of the trailer-control control output in case of actuation of the relay valve by the relay valve pilot control region and/or compressed air actuation of the TCV pilot control region.

6. The parking brake valve device as claimed in claim 1, wherein the TCV pilot control region is connected to the trailer-control control output via a TCV control valve, the TCV control valve being a switching valve that can be pneumatically controlled depending on the TCV pilot control region, which is configured to connect the trailer control output to the parking brake output when the pressure is below the switching pressure in the TCV pilot control region and is configured to connect the trailer-control output to the TCV pilot control region above the switching pressure.

7. An electropneumatic brake system, comprising:
a parking brake valve device as claimed in claim 1;
an electronic control device configured to output the first electrical control signal to the inlet valve and the second electrical control signal to the connecting valve for setting the driving setting or the parking setting or the trailer control setting;
the storage spring parking brake connected to the parking brake output; and
the trailer control valve connected to the trailer-control control output for controlling the trailer brake system, wherein the trailer control valve is configured to vent the trailer brake system when the trailer-control control output is supplied with air and is configured to supply the trailer brake system with air when the trailer-control control output is vented.

8. A parking brake valve device for controlling a storage spring parking brake in an electropneumatic brake system, wherein the parking brake valve device comprises:
a compressed air input configured to be connected to a compressed air supply;
a parking brake output configured to control the storage spring parking brake;
a trailer-control control output configured to control a trailer control valve (TCV) for a trailer brake system, the trailer-control control output being configured to be supplied with air for releasing the trailer brake system;
a relay valve pilot control region and a relay valve configured to be controlled by the relay valve pilot control region, which connects the compressed air input to the parking brake output when in an operated position and which vents the parking brake output when in a non-operated position;
a TCV pilot control region configured to control the trailer-control control output;
an inlet valve configured to be controlled with a first electrical control signal for supplying air to the TCV pilot control region and the relay valve pilot control region; and
a connecting valve configured to be controlled by a second control signal to connect and disconnect the TCV pilot control region and the relay valve pilot control region;
wherein the following settings are configured to be set by setting only the inlet valve and the connecting valve:
a driving setting with the parking brake output supplied with air and the trailer-control control output supplied with air,
a parking setting with the parking brake output vented and the trailer-control control output vented, and
a trailer control setting with the parking brake output vented and the trailer-control control output supplied with air; and
wherein the connecting valve is configured to vent, in a disconnecting setting, the relay valve pilot control region.

9. The parking brake valve device as claimed in claim 8, wherein the connecting valve is an electrically controlled 3/2-way valve with a connecting basic setting.

10. A parking brake valve device for controlling a storage spring parking brake in an electropneumatic brake system, wherein the parking brake valve device comprises:
a compressed air input configured to be connected to a compressed air supply;
a parking brake output configured to control the storage spring parking brake;
a trailer-control control output configured to control a trailer control valve (TCV) for a trailer brake system, the trailer-control control output being configured to be supplied with air for releasing the trailer brake system;
a relay valve pilot control region and a relay valve configured to be controlled by the relay valve pilot control region, which connects the compressed air input to the parking brake output when in an operated position and which vents the parking brake output when in a non-operated position;
a TCV pilot control region configured to control the trailer-control control output;
an inlet valve configured to be controlled with a first electrical control signal for supplying air to the TCV pilot control region and the relay valve pilot control region; and
a connecting valve configured to be controlled by a second control signal to connect and disconnect the TCV pilot control region and the relay valve pilot control region;
wherein the following settings are configured to be set by setting only the inlet valve and the connecting valve:
a driving setting with the parking brake output supplied with air and the trailer-control control output supplied with air,
a parking setting with the parking brake output vented and the trailer-control control output vented, and
a trailer control setting with the parking brake output vented and the trailer-control control output supplied with air; and
wherein a bypass circuit configured to automatically hold a pressure state of the relay valve pilot control region is connected to the relay valve pilot control region.

11. The parking brake valve device as claimed in claim 10, wherein the bypass circuit is configured to automatically connect the relay valve pilot control region and the pneumatic control input of the relay valve that is connected thereto to the compressed air input and/or the relay valve input in the presence of a sufficient actuation switching pressure and to hold the connected position until the relay valve pilot control region is actively vented.

12. The parking brake valve device as claimed in claim 11, wherein the bypass circuit is configured to automatically connect the relay valve pilot control region and the pneumatic control input of the relay valve that is connected thereto to the compressed air input and/or the relay valve input in the presence of a sufficient actuation switching pressure.

13. The parking brake valve device as claimed in claim 10, wherein in a vented state, the relay valve pilot control region is automatically kept in the vented state by the bypass circuit, in that the bypass circuit connects the relay valve pilot control region to a vent.

14. The parking brake valve device as claimed in claim 10, wherein the relay valve pilot control region is connected by the bypass circuit to the compressed air input or a vent respectively via a choke and at least one pneumatically controlled check valve to compensate for small air flows, wherein at least one of the check valves is open to connect the relay valve pilot control region to the compressed air input and/or the vent.

15. The parking brake valve device as claimed in claim 14, wherein only one of the check valves is open for connecting the relay valve pilot control region to either the compressed air input or the vent, and the other check valve is closed.

16. The parking brake valve device as claimed in claim 14, wherein the check valves are controlled by the relay valve pilot control region, wherein an input bypass valve is self-locking and an output bypass valve is open when in a basic setting.

* * * * *